US010562722B2

(12) United States Patent
Pugh et al.

(10) Patent No.: US 10,562,722 B2
(45) Date of Patent: Feb. 18, 2020

(54) MODIFIED K-MEMBER OF SUSPENSION ASSEMBLY AND METHOD OF MODIFICATION THEREOF

(71) Applicant: The Braun Corporation, Winamac, IN (US)

(72) Inventors: Michael R. Pugh, Winamac, IN (US); Eric Sajed Dosenbach, Winamac, IN (US)

(73) Assignee: THE BRAUN CORPORATION, Winamac, IN (US)

( * ) Notice: Subject to any disclaimer, the term of this patent is extended or adjusted under 35 U.S.C. 154(b) by 130 days.

(21) Appl. No.: 15/715,835

(22) Filed: Sep. 26, 2017

(65) Prior Publication Data

US 2018/0086578 A1    Mar. 29, 2018

Related U.S. Application Data

(60) Provisional application No. 62/401,348, filed on Sep. 29, 2016.

(51) Int. Cl.
| *B65G 69/28* | (2006.01) |
| *B62D 25/02* | (2006.01) |
| *A61G 3/06* | (2006.01) |
| *B60P 1/43* | (2006.01) |

(52) U.S. Cl.
CPC .......... *B65G 69/28* (2013.01); *B62D 25/025* (2013.01); *A61G 3/061* (2013.01); *B60P 1/43* (2013.01)

(58) Field of Classification Search
CPC ...... B65G 69/28; B62D 21/11; B62D 25/025; B60P 1/43; A61G 3/061
See application file for complete search history.

(56) References Cited

U.S. PATENT DOCUMENTS

| 3,275,370 | A | 9/1966 | Smith |
| 4,114,318 | A | 9/1978 | Brindle |
| 4,664,584 | A | 5/1987 | Braun et al. |
| 5,180,275 | A | 1/1993 | Czech et al. |
| 6,793,269 | B2 | 9/2004 | Pugh et al. |
| 6,860,543 | B2 | 3/2005 | George et al. |
| 7,364,219 | B2 | 4/2008 | Lowson et al. |
| 7,816,878 | B2 | 10/2010 | Heigl et al. |
| 7,837,203 | B1 * | 11/2010 | Schmidt ................ A61G 3/061 |
| | | | 280/43.11 |
| 7,934,290 | B2 | 5/2011 | Gherardi et al. |

(Continued)

*Primary Examiner* — Darlene P Condra

(74) *Attorney, Agent, or Firm* — Taft Stettinius & Hollister LLP; Stephen F. Rost

(57) ABSTRACT

A K-member for a passenger vehicle includes a body, a first cross member coupled to the body, and a second cross member coupled to the body at a location rearward of the first cross member. The first and second cross members are coupled transversely with respect to the body. A reinforcement member is coupled to the body and extends transversely between opposite sides of the body. The K-member further includes a first and second coupling member. Each coupling member is coupled to the body and includes an elongated portion, a curved portion, a toe link joint, and a first mounting location. The toe link joint is angularly disposed relative to the elongated portion. When assembled to the passenger vehicle having a rear passenger compartment, the entire K-member is positioned below a horizontal plane defined by a floor in the compartment.

19 Claims, 12 Drawing Sheets

(56) References Cited

U.S. PATENT DOCUMENTS

| | | | |
|---|---|---|---|
| 8,807,575 B2 | 8/2014 | Bartel et al. | |
| 9,476,246 B2 | 10/2016 | Fairchild | |
| 2006/0267375 A1 | 11/2006 | Enomoto | |
| 2007/0062118 A1 | 3/2007 | Lindemann et al. | |
| 2008/0134490 A1* | 6/2008 | Buchwitz | B62D 21/11 29/468 |
| 2009/0072583 A1 | 3/2009 | Elliott et al. | |
| 2010/0289299 A1 | 11/2010 | Kitayama | |
| 2010/0295337 A1 | 11/2010 | Elliott et al. | |
| 2013/0113176 A1* | 5/2013 | Eguchi | B60G 3/20 280/124.107 |
| 2014/0248109 A1 | 9/2014 | Johnson et al. | |
| 2014/0356118 A1 | 12/2014 | Friedlinghaus et al. | |
| 2015/0014955 A1* | 1/2015 | Leibl | B60G 3/20 280/124.107 |
| 2015/0158529 A1* | 6/2015 | Leibl | B60K 17/00 180/377 |
| 2015/0197130 A1* | 7/2015 | Smith | B60G 11/46 280/124.175 |
| 2015/0375590 A1* | 12/2015 | Mohrlock | B60G 3/20 280/5.5 |
| 2016/0194029 A1* | 7/2016 | Kramer | B60G 21/0555 280/124.109 |
| 2016/0221607 A1* | 8/2016 | Schmidt | B62D 21/11 |
| 2016/0311287 A1* | 10/2016 | Groen | B60G 11/181 |
| 2017/0050674 A1* | 2/2017 | Wolf-Monheim | B62D 21/11 |
| 2017/0368930 A1* | 12/2017 | Sangha | B60K 17/04 |
| 2018/0281860 A1* | 10/2018 | Tanaka | B62D 21/11 |

\* cited by examiner

MODIFIED K-MEMBER OF SUSPENSION ASSEMBLY AND METHOD OF MODIFICATION THEREOF

FIELD OF THE DISCLOSURE

The present application relates to a passenger vehicle for transporting one or more passengers, and more particularly to a modified passenger vehicle which is configured to provide access to the vehicle for a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van is retrofitted with a ramp to enable a physically limited individual using a wheelchair to enter and exit the vehicle without the assistance of another individual.

Other known products for retrofitting a vehicle, such as a van, include wheel chair lifts, lift platforms, and lowered floor surfaces. In some instances, a floor of an original equipment manufacturer (OEM) vehicle is lowered or otherwise modified to accommodate an entry and exit of the physically limited individual through a side door or entrance of the vehicle. Once inside the vehicle, individual who uses the assisted entrance is located in a rear passenger compartment of the vehicle adjacent to or behind the side entrance.

In one known retrofitted vehicle, a floor of the OEM vehicle is lowered to accommodate the physically limited passenger, e.g., one seated in a wheelchair. In some vehicles, which are considered as viable candidates for retrofitting, the construction of the OEM vehicle requires significant modification to accommodate the lowered floor. Not only must a subfloor be added, but additional floor space inside the vehicle, and in particular, the rear passenger compartment. Consequently, what is needed is a modification to an OEM vehicle which reduces the amount of changes required to retrofit the OEM vehicle to provide access to individuals confined to a wheelchair or other mobility alternatives to wheelchairs.

SUMMARY

In one embodiment, a K-member is provided for a modified passenger vehicle to accommodate a wheelchaired passenger in a rear passenger compartment thereof. The K-member includes a body having a front end, a rear end opposite the front end, a first side, and a second side opposite the first side; a first cross member coupled to the body; a second cross member coupled to the body at a location rearward of the first cross member, where the first and second cross members are coupled transversely with respect to the body between the first side and the second side; a first coupling member coupled to the body at a location towards the front end and first side, the first coupling member including an elongated portion, a curved portion, and a toe link joint, where the toe link joint is angularly disposed relative to the elongated portion; and a second coupling member coupled to the body at a location towards the front end and second side, the second coupling member including an elongated portion, a curved portion, and a toe link joint, where the toe link joint is angularly disposed relative to the elongated portion.

In one example of this embodiment, a reinforcement member is coupled to the body and extends transversely between the first and second sides, the reinforcement member being substantially parallel to the first and second cross members. In a second example, the reinforcement member is located below the first cross member. In a third example, the body includes a first mounting location and a second mounting location, the first mounting location disposed at the rear end and first side, and the second mounting location disposed at the rear end and second side; the first coupling member comprises a third mounting location; and the second coupling member comprises a fourth mounting location. In a fourth example, the third mounting location defines a splined opening; and a capsule and a bushing are coupled to the third mounting location via the splined opening.

In a fifth example, the body defines a first cavity and a second cavity; the elongated portion of the first coupling member is positioned within the first cavity; and the elongated portion of the second coupling member is positioned within the second cavity. In a sixth example, each toe link joint comprises a first finger and a second finger oriented in a direction towards the first or second side. In a seventh example, the first finger and the second finger each includes an opening through which a pivot axis is defined. In a further example, the body includes a spring link joint adapted to couple to a spring link.

In another embodiment of this disclosure, a coupling member for being coupled to a K-member of a vehicular suspension system includes a body including an elongated portion integrally formed with a curved portion; a toe link joint integrally formed with the curved portion, the toe link joint including a first finger spaced from a second finger; a mounting location formed in the body at a location between the elongated portion and the toe link joint; a capsule coupled to the mounting location; and a bushing coupled to the capsule.

In one example of this embodiment, the toe link joint is angularly disposed relative to the elongated portion. In a second example, the toe link joint is angularly disposed at an angle greater than 30° relative to the elongated portion. In a third example, the first finger and the second finger each includes an opening through which a pivot axis is defined. In another example, the mounting location includes internal splines defined within an opening formed therein.

In a further embodiment of the present disclosure, a vehicle modified to accommodate a wheelchaired passenger includes a chassis including a front and a rear; a rear passenger compartment defined at the rear of the chassis, the rear passenger compartment including a lowered vehicular floor and an amount of floor space defined therein by at least a rear wall, a first side wall, and a second side wall; a suspension system including a K-member and a pair of low-profile trailing arms; the K-member including a body having a front end, a rear end opposite the front end, a first side, and a second side opposite the first side; a first cross member coupled to the body; a second cross member coupled to the body at a location rearward of the first cross member, where the first and second cross members are coupled transversely with respect to the body between the first side and the second side; a first coupling member coupled to the body at a location towards the front end and first side, the first coupling member including an elongated portion, a curved portion, and a toe link joint, where the toe link joint is angularly disposed relative to the elongated portion; and a second coupling member coupled to the body at a location towards the front end and second side, the second coupling member including an elongated portion, a curved portion, and a toe link joint, where the toe link joint is angularly disposed relative to the elongated portion, wherein, in an assembled configuration, the K-member and the pair of low-profile trailing arms are positioned below a horizontal plane defined by the lowered vehicular floor of the rear passenger compartment.

In one example of this embodiment, each of the pair of low-profile trailing arms includes a body having a first end and a second end, the body including a sloped portion at the first end, a comfort link at the second end, and a low-profile portion defined therebetween. In a second example, a reinforcement member is coupled to the body and extends transversely between the first and second sides, the reinforcement member being substantially parallel to the first and second cross members. In another example, the reinforcement member is located below the first cross member. In a further example, the body comprises a first mounting location and a second mounting location, the first mounting location disposed at the rear end and first side, and the second mounting location disposed at the rear end and second side; the first coupling member comprises a third mounting location; and the second coupling member comprises a fourth mounting location. In yet a further example, the body defines a first cavity and a second cavity; the elongated portion of the first coupling member is positioned within the first cavity; and the elongated portion of the second coupling member is positioned within the second cavity.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
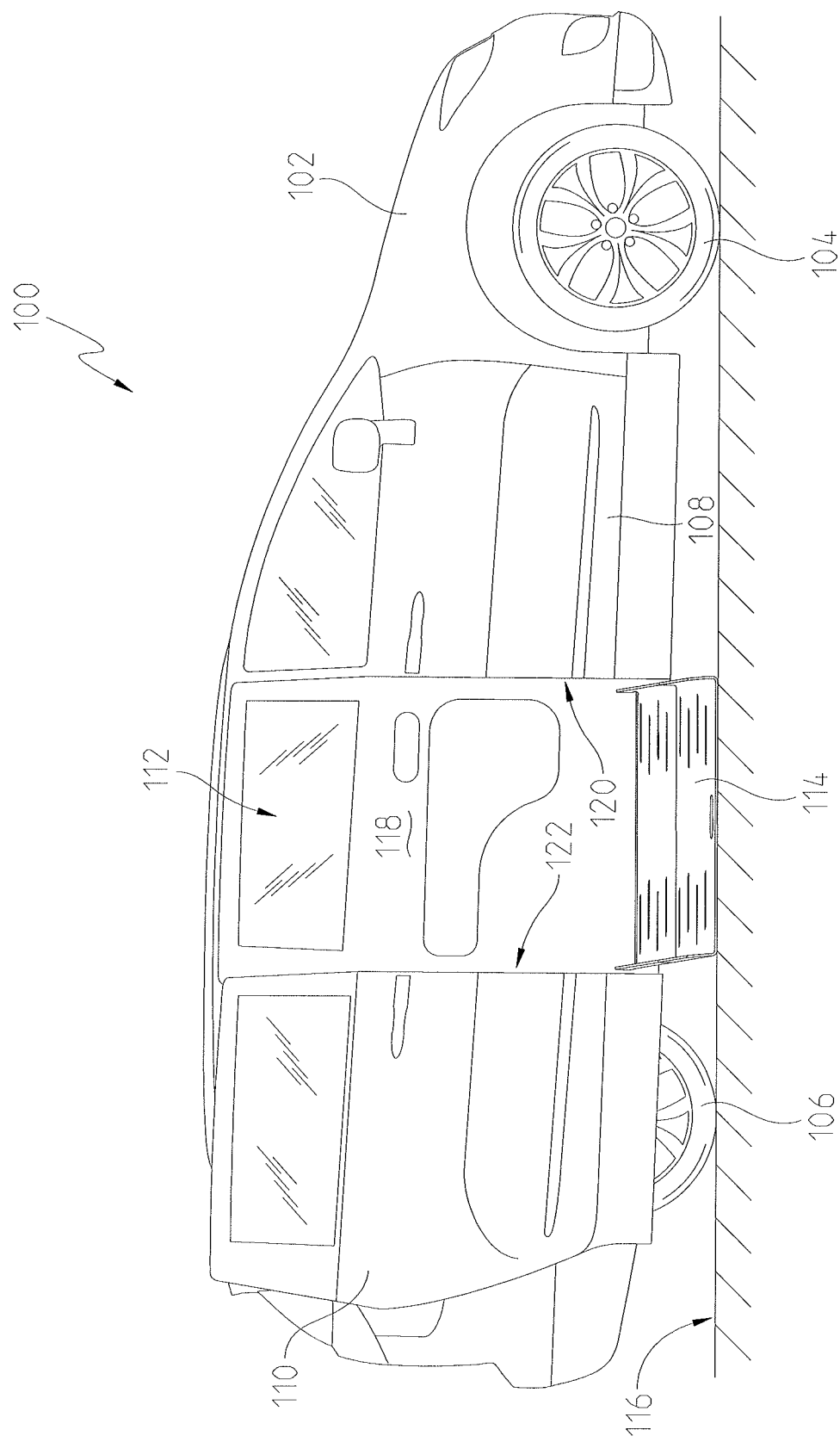
FIG. 1 is an elevational side view of a passenger vehicle including an access ramp.

FIG. 1 illustrates a vehicle 100, commonly identified as a passenger van, available from any number of United States and foreign manufacturers. In the illustrated embodiment, the vehicle 100 includes a unibody construction, but other vehicles having a frame on body construction, are also included in the present disclosure. Consequently, the use of vehicle herein includes all types and kinds of vehicles with a body on frame construction, a unibody construction, or other constructions. In addition, while the passenger van 100 is illustrated in FIG. 1, the present disclosure is directed to all passenger vehicles carrying one or more passengers.

The vehicle 100 includes a body 102 operatively coupled to front wheels 104 and rear wheels 106. The vehicle 100 includes a unibody construction. A first passenger side door 108 is located between the front wheels 104 and rear wheels 106 and provides access to a passenger for sitting in a front seat of the vehicle adjacent to the driver.

The vehicle 100 includes a second passenger side door 110 coupled to the unibody frame. The side door may be modified to slide along one or more tracks to increase the size of an opening 112 to the interior of the vehicle. The widened opening 112 provides access to a passenger seated in a wheelchair. The opening 122 is defined on the sides thereof by an edge 120 of the door 108 and the edge 122 of the door 110. The vehicle is further modified to include a ramp assembly 114 which provides rolling access of a wheelchair from a ground surface 116 into an interior 118 of the vehicle 100. The ramp assembly 114 is installed at the opening 112 and is movable between the interior of the vehicle, where it is stored in some embodiments, and to the exterior for wheelchair access.

In known modified vehicles, such as the modified van, the middle row of seats is removed from the manufacturer supplied vehicle to enable access to a wheelchair supporting a passenger. Once the wheelchaired passenger moves into the interior of the vehicle, the passenger or caregiver locates the wheelchair in the middle portion of the interior behind the driver and passenger seats of the front row. As used herein, a wheelchaired passenger is used to indicate that the individual is making use of a wheelchair, whether that use is temporary or permanent.

In one such modification, the floor of the OEM vehicle may be lowered in order to better accommodate a wheelchaired passenger and provided additional floor space for such accommodation. In doing so, a conventional suspension assembly may be retrofitted to allow for the lowered vehicle floor.

Figure 2:
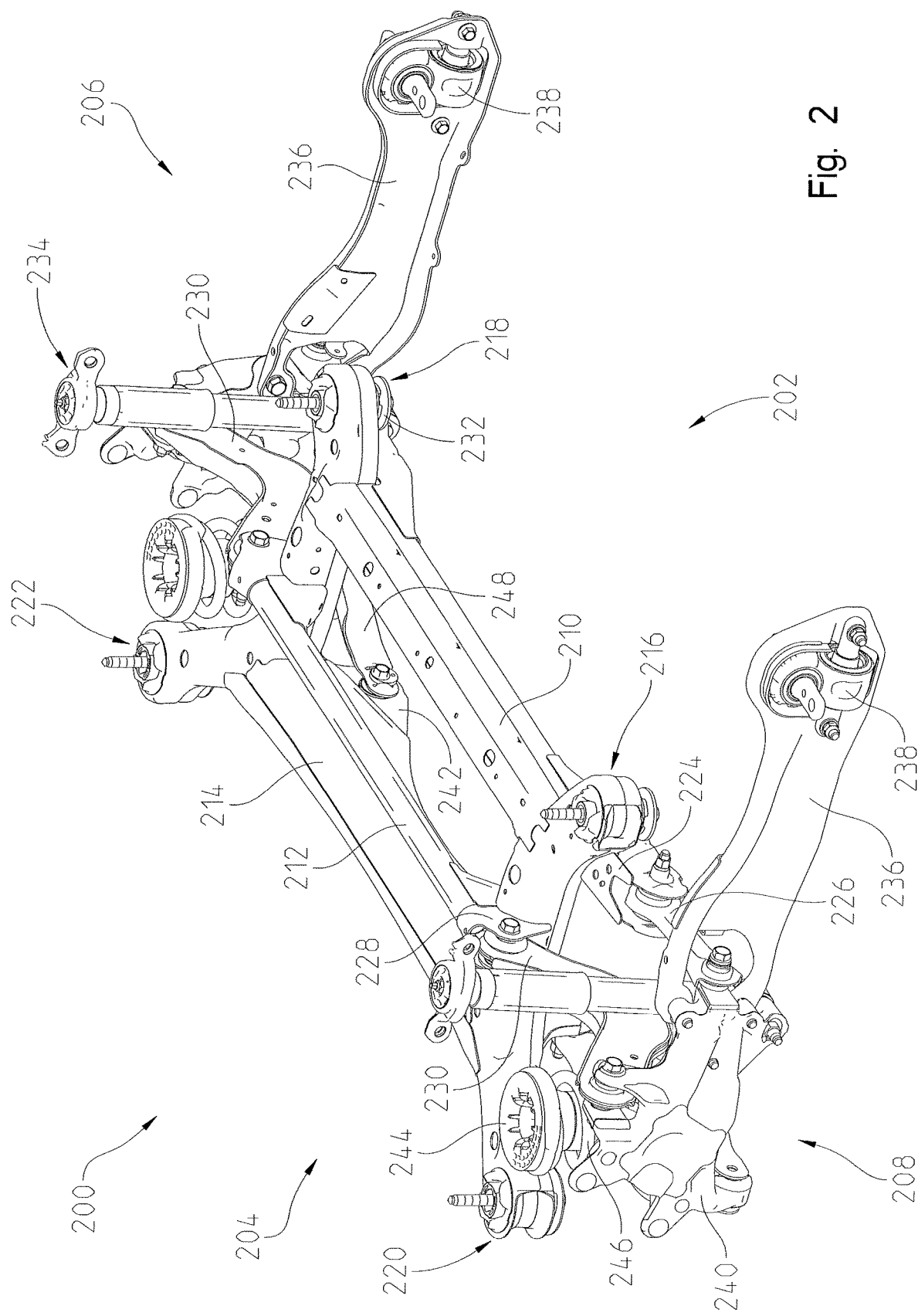
FIG. 2 is a side perspective view of a portion of a first embodiment of a suspension assembly.

In FIG. 2, a first embodiment of a K-member 200 may be oriented with respect to a front 202 of the vehicle and a rear 204 thereof. Moreover, the K-member 200 may include a first or driver side 206 and a second or passenger side 208 of the vehicle. The K-member may include a main body that includes a first cross member 210, a second cross member 212, and a third cross member 214. The first cross member 210 is disposed towards the front 202 of the K-member 200, the third cross member 214 is disposed towards the rear 204, and the second cross member 212 is disposed therebetween. Each cross member is coupled to opposite ends of the K-member in a direction transverse to a longitudinal axis that passes through the front and rear ends of the vehicle. As shown, the second cross member 212 may be positioned at a location that is higher than the first and third cross members.

The K-member 200 may further include a plurality of mounting locations for mounting to the body (not shown) of the vehicle. A first mounting location 216 is disposed to the front 202 and second side 208 of the K-member 200, and a second mounting location 218 is disposed to the front 202 and first side 206 thereof. A third mounting location 220 is disposed to the rear 204 and second side 208, and a fourth mounting location 222 is disposed to the rear and first side 206 of the K-member 200. A bushing 232 may be located in each mounting location.

The K-member 200 also includes a plurality of joint locations. In FIG. 2, for example, a toe link joint 224 may connect a toe link 226 or mechanism to the K-member 200. Moreover, a camber link joint 228 may connect a camber link 230 to the K-member 200. Further, a spring link joint 242 may connect a spring link 248 to the K-member 200. The toe link joint 224, the camber link joint 228, and the spring link joint 242 may further couple the K-member 200 to a rear knuckle 240 or the like.

The suspension assembly may also include a damper assembly 234, a sprint isolator 244 and a spring 246. For purposes of this disclosure, these features may remain of any conventional type known in the art.

As also shown in FIG. 2, a pair of trailing arms 236 are shown. Each trailing arm 236 may be an arm of the vehicle suspension connected between an axle and a pivot point located on the vehicle chassis. It is often used on a front axle of the vehicle. In FIG. 2, the trailing arms 236 extend from a location adjacent to the front end of the K-member 200 (but not directly connected thereto) toward the front end 202 of the vehicle. The forward-most portion of each trailing arm 236 includes a comfort link 238, as shown.

Figure 3:
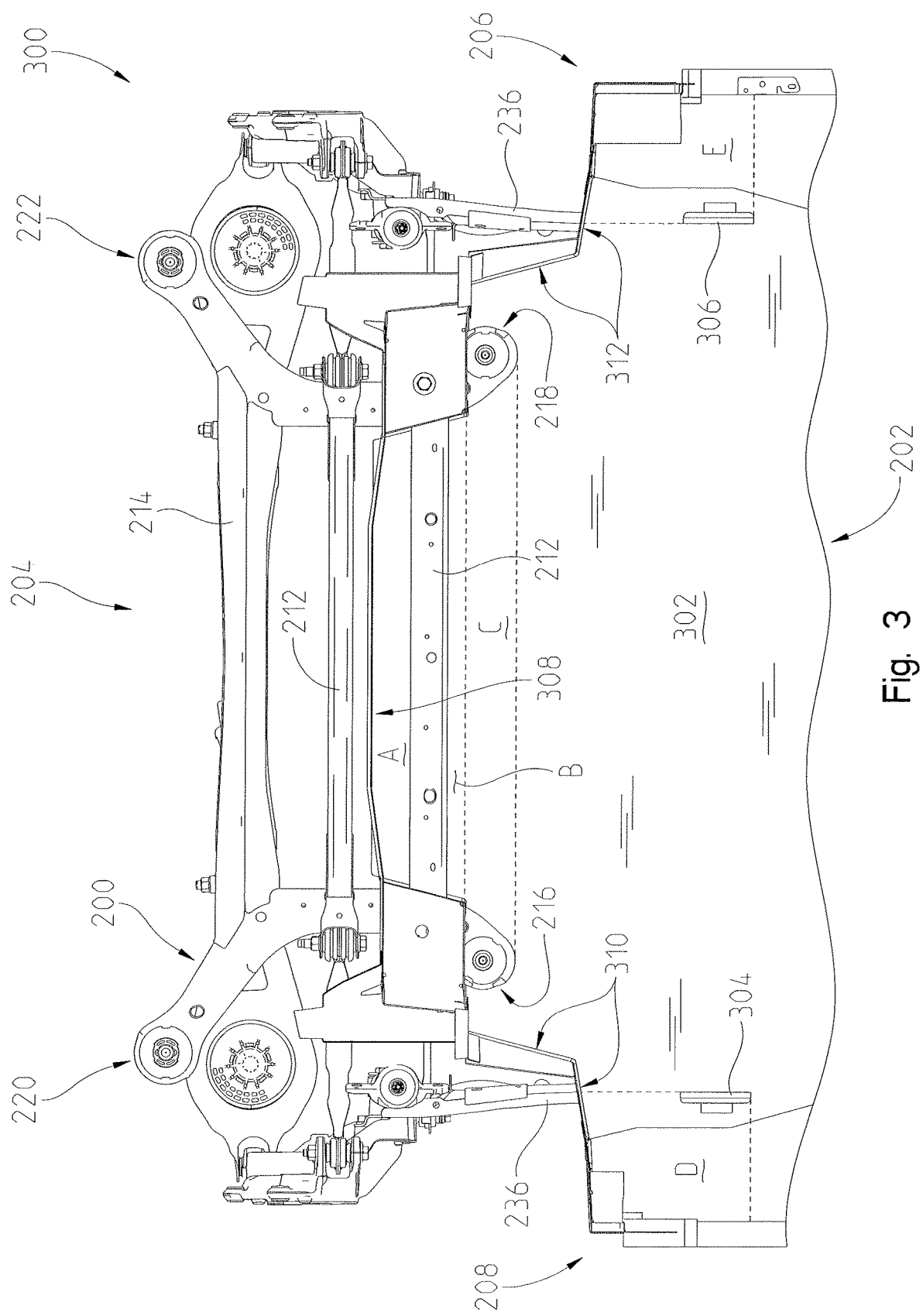
FIG. 3 is a partial top view of an interior of a passenger vehicle including the suspension assembly of FIG. 2 and a lowered vehicle floor to accommodate a wheelchair and a physically limited passenger.

As part of the above-mentioned modifications to the vehicle and its floor, the K-member and trailing arms can present challenges to retrofit the OEM vehicle for a wheelchaired passenger. In FIG. 3, for example, a top view 300 of an interior of a rear passenger compartment of the vehicle is shown. In this illustrated embodiment, the modified floor 302 is lowered by several inches. In doing so, portions of the K-member 200 and trailing arms 236 interfere with available floor space in the rear passenger compartment. In particular, the first cross member 210 is located above the floor 302. Similarly, the first mounting location 216 and the second mounting location 218 are disposed above the floor 302. Each trailing arm 236 also extends above the floor. As shown, a top portion 304 of one trailing arm and comfort link and a top portion 306 of a second trailing arm and comfort link extend above the lowered floor 302.

In FIG. 3, the available floor space of the rear passenger compartment is defined by a rear wall 308, a first set of side walls 310, and a second set of side walls 312. To further understand the limited available floor space due to the K-member and trailing arms, FIG. 3 further includes several portions of the floor 302 divided into sections. For example, a rear-most section A is shown defined between the rear wall 308 and the first cross member 210 of the K-member 200. A second floor section B and a third floor section C are located forward of the first cross member 210, and defined between the first mounting location 216 and the second mounting location 218. A fourth floor section D is located to the second side 208 of the vehicle and between the first side wall 310 and top portion 304 of the first trailing arm. A fifth floor section E is located to the first side 206 of the vehicle and between the second side wall 312 and the top portion 306 of the second trailing arm. Due to the size and shape of the K-member 200 and the trailing arms 236, each of the aforementioned floor sections (A, B, C, D, and E) may be unused floor space, or at least limit the available floor space within the rear passenger compartment of the vehicle. Due to floor space limitations, it may be difficult for a wheelchaired passenger to be positioned or maneuver within the available floor space due to these limitations. To overcome some of these limitations found in the first embodiment of FIGS. 2 and 3, another embodiment of a K-member and trailing arms may be provided to increase the amount of floor space within the rear passenger compartment of the vehicle for a wheelchaired passenger.

Figure 4:
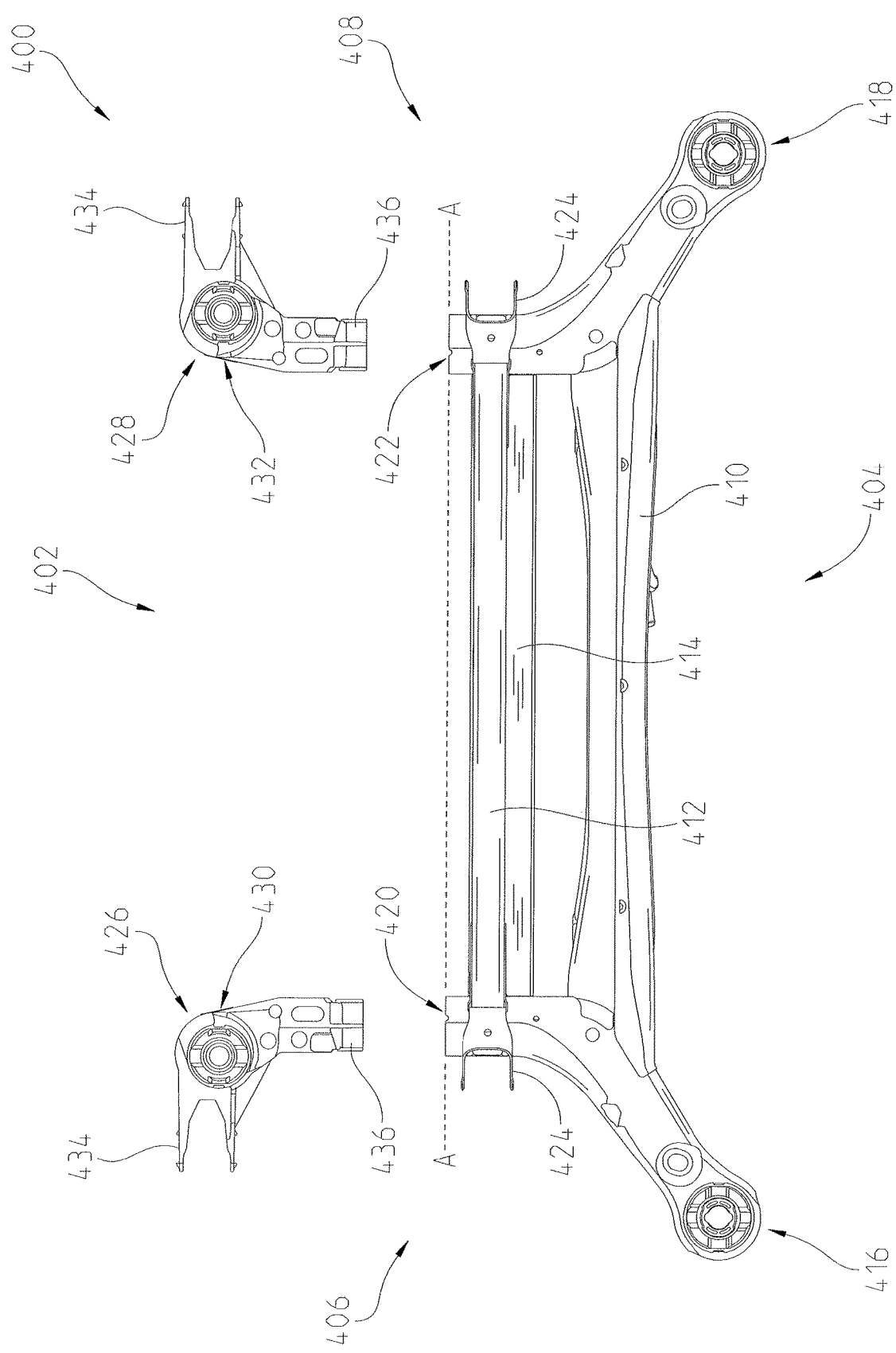
FIG. 4 is a partial exploded top view of another embodiment of a K-member of a suspension assembly.

Referring to FIGS. 4-7, a second embodiment of a K-member 400 is illustrated. The second embodiment or modified K-member 400 is oriented with a front end 402, a rear end 404, a first or driver's side 406, and a second or passenger's side 408. Unlike the K-member 200 of FIG. 2, the K-member 400 of FIG. 4 is designed with only two cross members, i.e., a rear cross member 410 and a front cross member 412. In this embodiment, the rear cross member 410 is disposed rearwardly of the front cross member 412. Each cross member is disposed transversely across the K-member between the first side 406 and the second side 408.

Unlike the K-member 200, the modified K-member 400 may also include a reinforcement member or layer 414. The reinforcement member or layer 414 may have a square cross-section and be rectangularly-dimensioned. The reinforcement member 414 may be located below a bottom surface or portion of the front cross member 412, as shown in FIG. 4. The reinforcement member 414 may be formed of a mild steel or other type of steel. Other materials may also be used, and this disclosure is not limited to any particular type of material.

The reinforcement member 414 is structured to be coupled via a welding or other coupling means at both ends thereof. In one example, the reinforcement member 414 may be coupled to the first side 406 and the second side 408 of the K-member 400. In another example, the reinforcement member 414 may be coupled to at least a portion of the front cross member 412. In a further example, the reinforcement member 414 may be coupled to both the front cross member 412 and the opposite ends of the K-member 400. In any event, the reinforcement member 414 is located below or underneath the front cross member 412, and it stretches in a transverse direction between the first side 406 and the second side 408.

It is also worth noting that while the reinforcement member 414 is located below the front cross member 412, the term "below" and "underneath" are interpreted differently for purposes of this disclosure. For "below", the reinforcement member 414 may be located below a horizontal plane that intersects the front cross member 412, but it may not be and does not need to be "underneath" the front cross member 412. If the reinforcement member 414 is underneath the front cross member 412, then it would be aligned within a vertical plane that passes through the front cross member 412. In this instance, the reinforcement member 414 would be both "below" and "underneath" the front cross member 412. For purposes of this disclosure, however, it is sufficient for the reinforcement member 414 to be below, but not necessarily underneath, the front cross member 412. In fact, in the illustrated embodiment of FIG. 4, the reinforcement member 414 is offset to the rear 404 with respect to the front cross member 412.

As shown in FIG. 4, a first mounting location 416 is disposed at the rear 404 and first side 406 of the modified K-member 400, and a second mounting location 418 is disposed at the rear 404 and second side 408 thereof. A camber link joint 424 is axially aligned or coupled to the front cross member 412. The camber link joint 424 may couple a camber link (not shown) to the K-member 400.

The aforementioned portions of the modified K-member 400 may be the same as or similar to the K-member 200. However, as shown, the modified K-member 400 differs from the K-member 200 along axis A-A. Here, the axis A-A may represent a cut line that is defined through a first hole 420 and a second hole 422 in the K-member. Each hole is located forward or to the front of the front cross member 412. In view of this cut line A-A, the front mounting locations and toe joint locations are removed.

In view of this removal, the modified K-member 400 may include a first coupling member 426 and a second coupling member 428. Each coupling member may be manufactured as a casting, or it may be a machined or welded piece. The first coupling member 426 is located on the first side 406 of the K-member 400, and the second coupling member 428 is located on the second side 408 thereof. Each coupling member defines a mounting location. The first coupling member 426 defines a third mounting location 430, and the second coupling member 428 defines a fourth mounting location 432. In addition, each coupling member includes a toe link joint 434 and an elongate portion 436. As shown in FIG. 4, the toe link joint 434 is angularly oriented with respect to the elongate portion 436 (see angle Θ in FIG. 5 as a similarly depicted angle). For example, the toe link joint 434 can be angled at least 30° with respect to the elongate portion. In another example, the angle may be greater than 60°. In a further example, the angle may be approximately or greater than 90°.

Each coupling member may be coupled to the K-member 400 by inserting the elongate portion 436 into a sleeve or cavity defined in the K-member 400. This is further shown in FIG. 5. The coupling member can then be welded or coupled to the K-member 400 in any known manner. The coupling member may be plug welded in several locations as well. With respect to the K-member 200 of FIG. 2, the toe link joint 434 of each coupling member is located rearwardly than the toe link joint 224 of FIG. 2.

Figure 5:
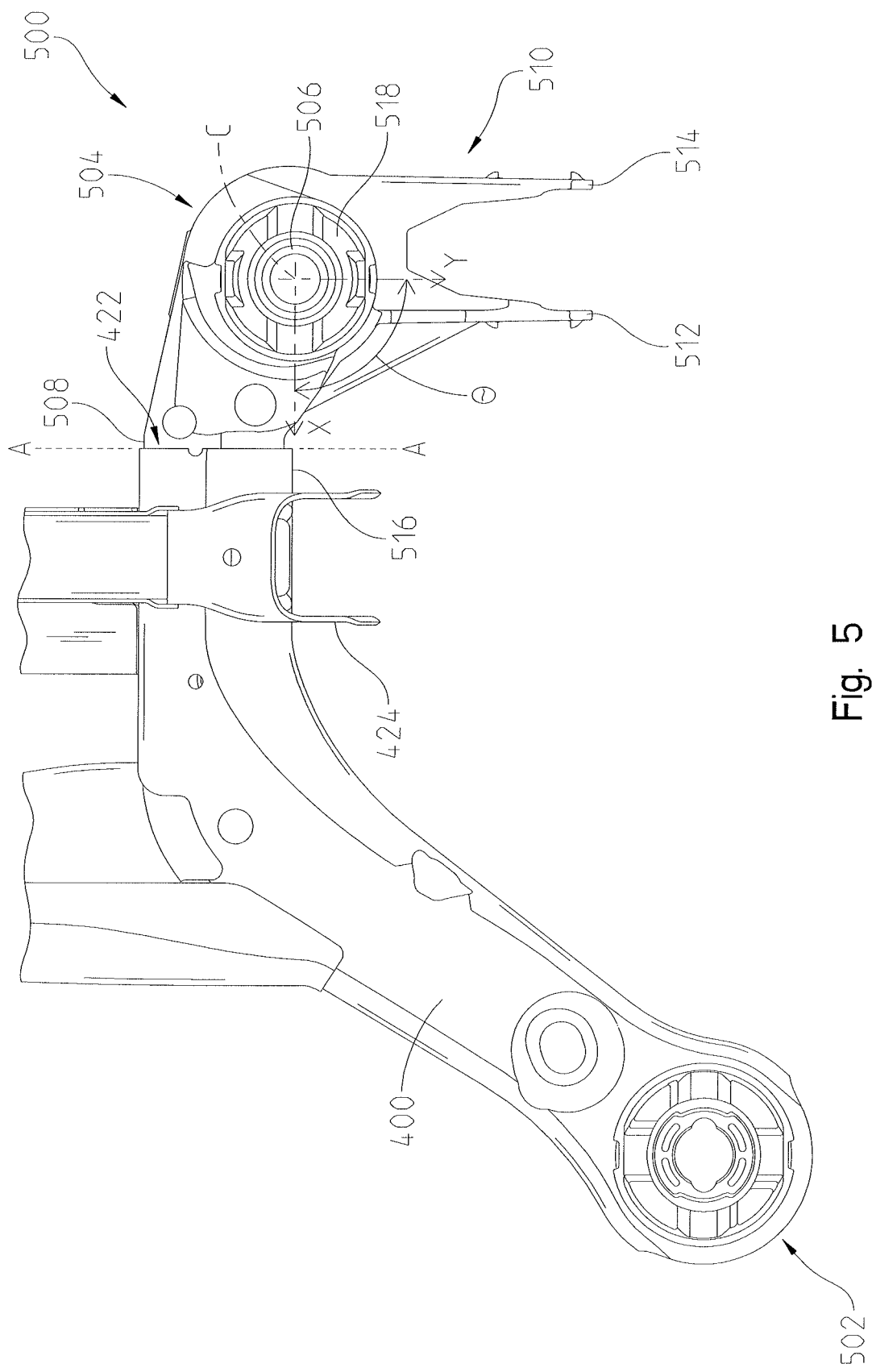
FIG. 5 is a partial top view of the K-member of FIG. 4.
Figure 6:
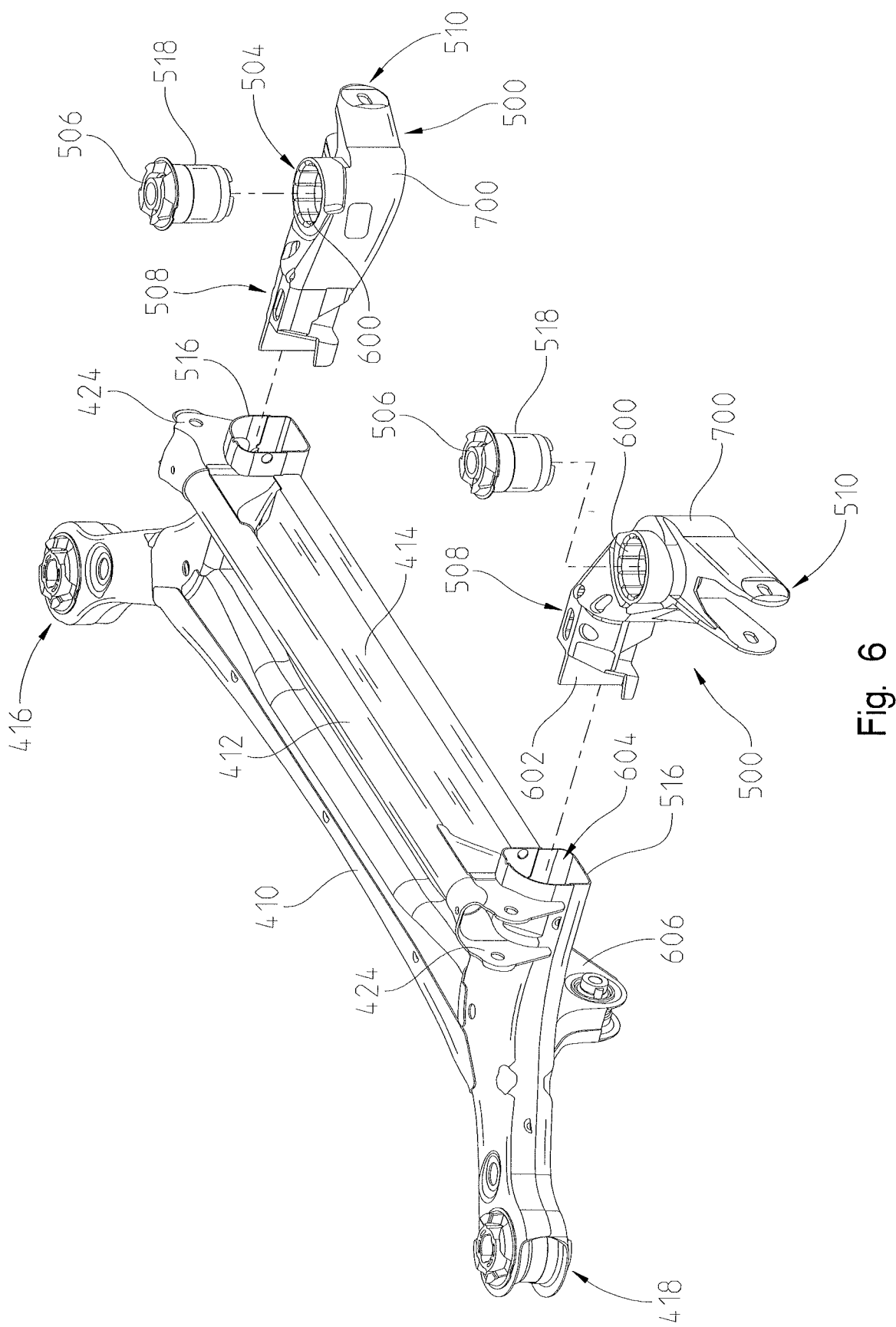
FIG. 6 is a partial exploded side perspective view of the K-member of FIG. 5.

In FIGS. 5-7, an exemplary coupling member 500 is shown. The coupling member 500 is similar to the first coupling member 426 and the second coupling member 428 of FIG. 4. Here, the coupling member 500 may be coupled to the modified K-member 400 as shown. An interface A-A is shown between the coupling member 500 and the K-member 400. The interface or cut line A-A is shown passing through the through-hole 422 defined in the K-member 400. With the K-member 400 being substantially hollow or at least including a cavity or sleeve portion 516, an elongated portion or arm 508 of the coupling member 500 may be inserted therein. As previously described, the arm 508 or elongated portion of the coupling member 500 may be plug welded or welded in any known manner to the interior sleeve portion 516 of the K-member 400.

In the embodiment of FIG. 5, the K-member 400 includes a rear mounting location 502 which corresponds to the second rear mounting location 418 of FIG. 4. Moreover, the coupling member 500 includes a front mounting location 504. The front mounting location 504 may correspond to the second mounting location 428 in FIG. 4. Here, the front mounting location 504 defines an axis that passes through a center point C.

The coupling member 500 may also include a toe link joint 510 formed by a first finger 512 and a second finger 514. The first finger 512 and the second finger 514 may be directed in a direction outwardly, i.e., towards either the first side 406 or the second side 408. Each finger may include an opening 702 (FIG. 7B) which defines a pivot axis or coupling point. In any event, the toe link joint 510 is oriented in a direction Y as shown in FIG. 5. The arm 508 may be disposed at an angle Θ relative to the toe link joint 510. In one embodiment, the arm 508 may be disposed along direction X as shown in FIG. 5. In one example, angle Θ may be greater 30°. In another example, the angle Θ may be between 45-120°. In a non-limiting example, the angle Θ may be approximately 90°.

Figure 7A:
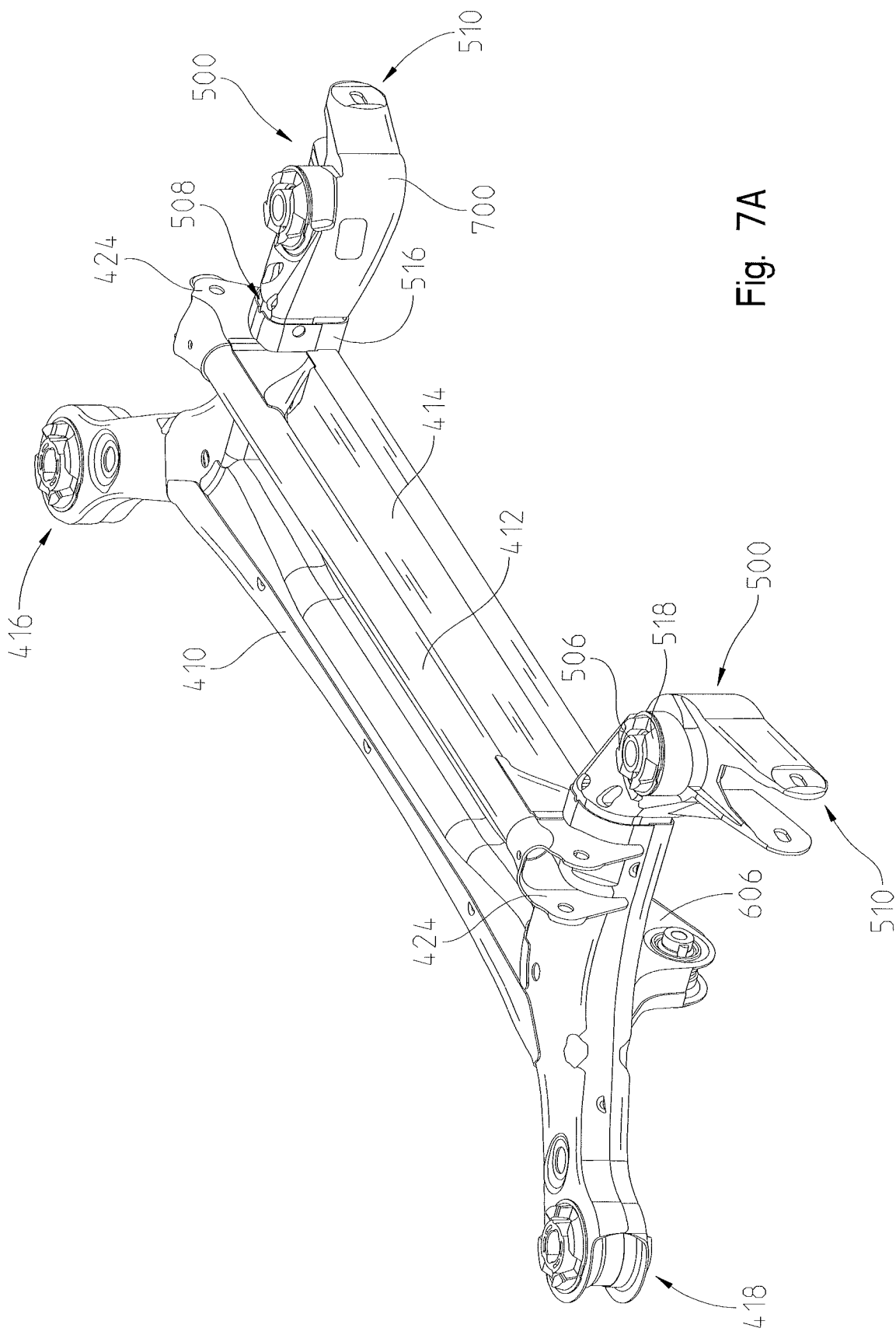
FIG. 7A is a side perspective view from above of the assembled K-member of FIG. 5.

The coupling member 500 may further include a curved portion 700 as shown in FIG. 7A. The curved portion 700 is defined between the arm 508 or elongated portion and the toe link joint 510. Moreover, the curved portion 700 is located on the inside of the coupling member 500, or opposite the direction in which the toe link joint 510 is oriented.

As shown in FIGS. 5 and 6, the front mounting location 504 may define an opening with inner splines 600. As such, a capsule 518 and bushing 506 may be disposed in the splined opening of the mounting location 504 as shown in FIG. 5. The capsule 518 may be coupled with the inner splines 600 of the mounting location 504. The bushing 506 may be pressed into the capsule in any known manner.

The connection between the coupling member 500 and the K-member 400 is shown in more detail in FIG. 6. The coupling member 500 may include an arm member 602 and other structure that is inserted into a sleeve opening 604 of the sleeve portion 516 of the K-member 400. The arm member 602 may be fastened, adhered, welded or coupled to the K-member 400 in any known manner. Moreover, the K-member 400 and coupling member 500 may be welded to one another along the interface A-A.

Figure 7B:
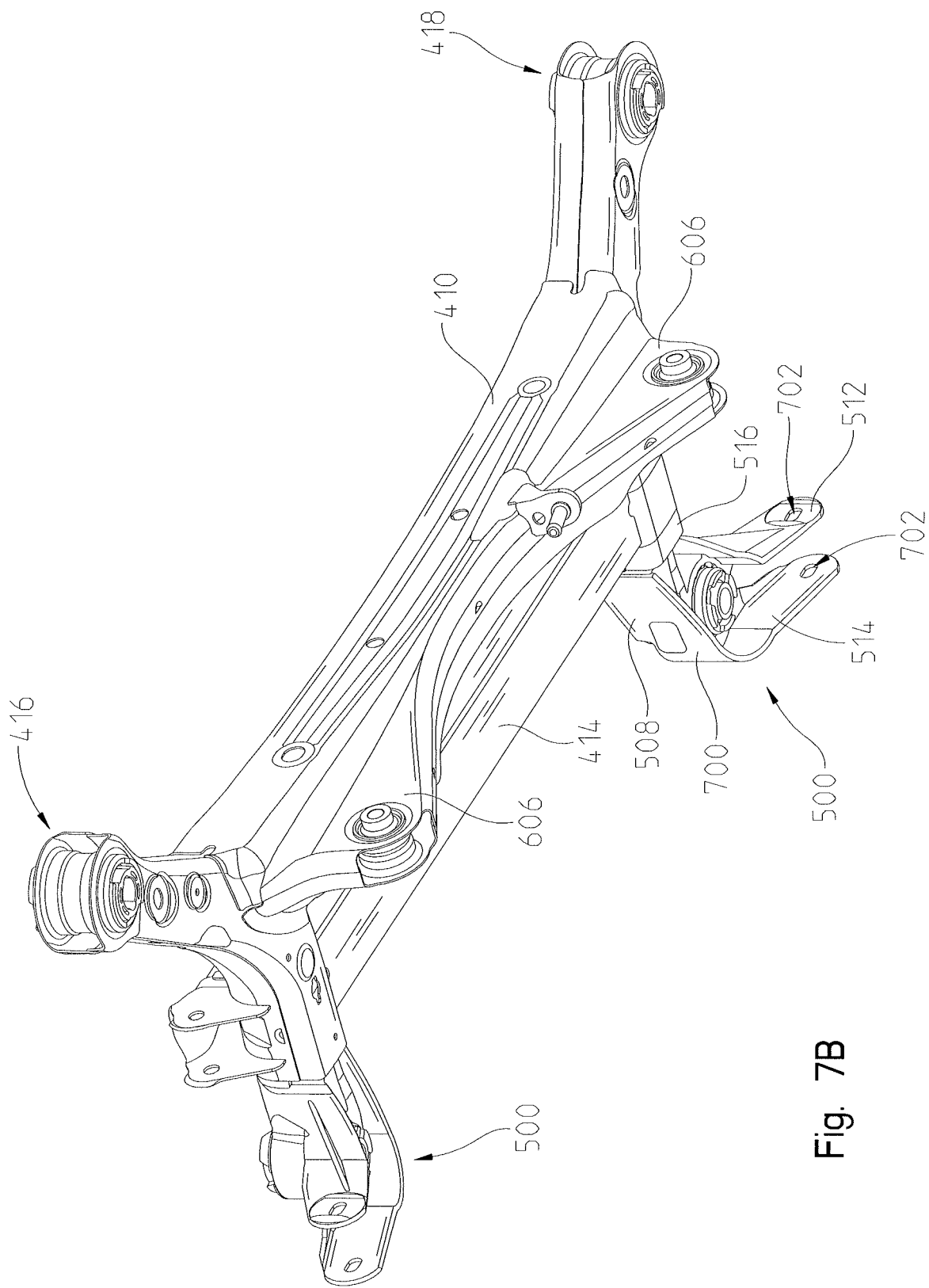
FIG. 7B is a side perspective view from below of the assembled K-member of FIG. 5.

Similar to the K-member 200, the modified K-member 400 may also include a spring link joint 606 for coupling to a spring link (not shown). This is best shown in FIGS. 6, 7A, and 7B. The modified K-member 400 may further include exhaust hanger clips which may be coupled to an exhaust system of the vehicle. A gusset support (not shown) may also be disposed at a location below a portion of the reinforcement layer 414 and coupling member. This gusset support may be provided as additional structural support to the K-member 400.

Figure 8:
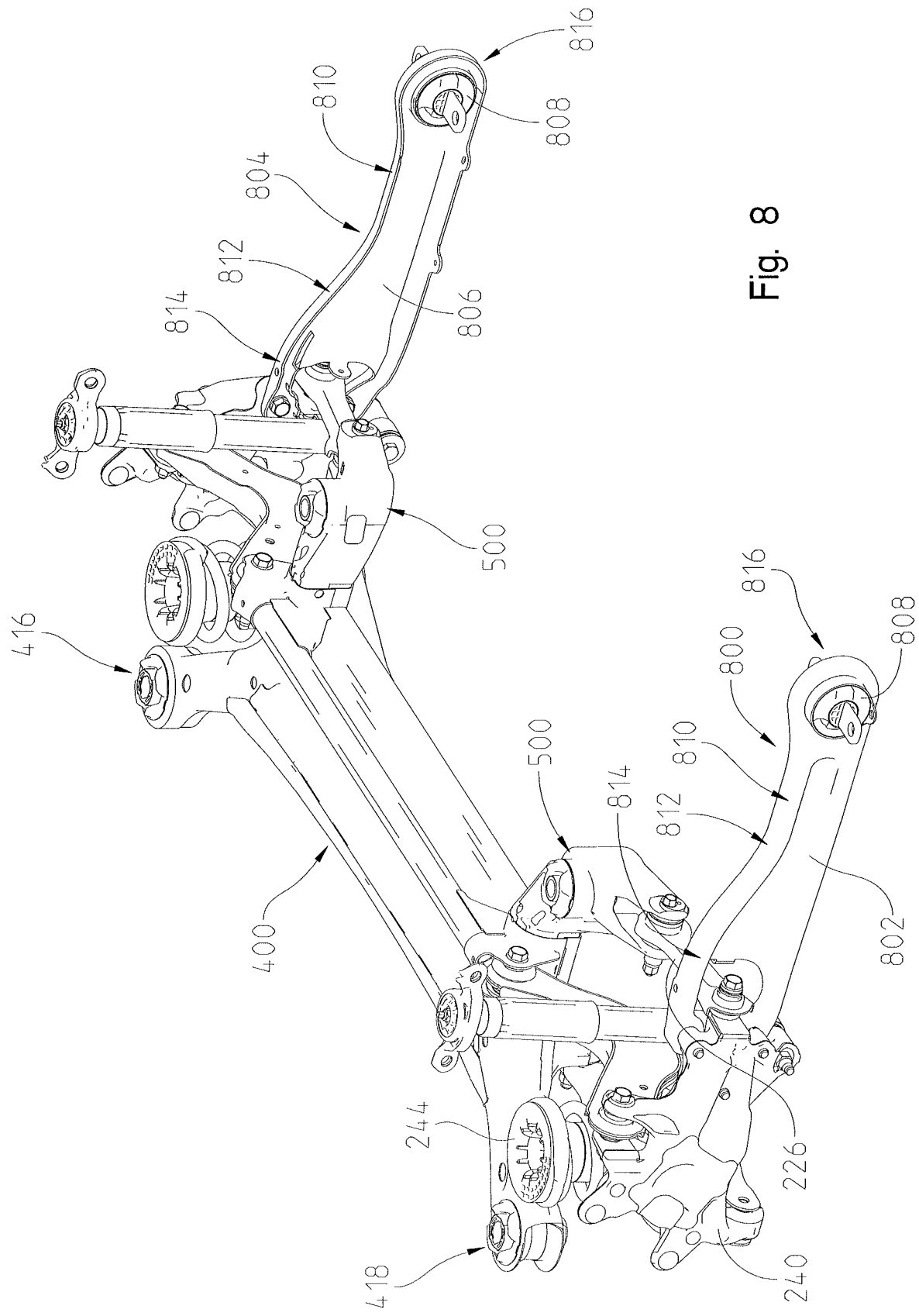
FIG. 8 is a partial side perspective view of a suspension assembly with the K-member of FIG. 5 including a modified side trailing member.
Figure 9:
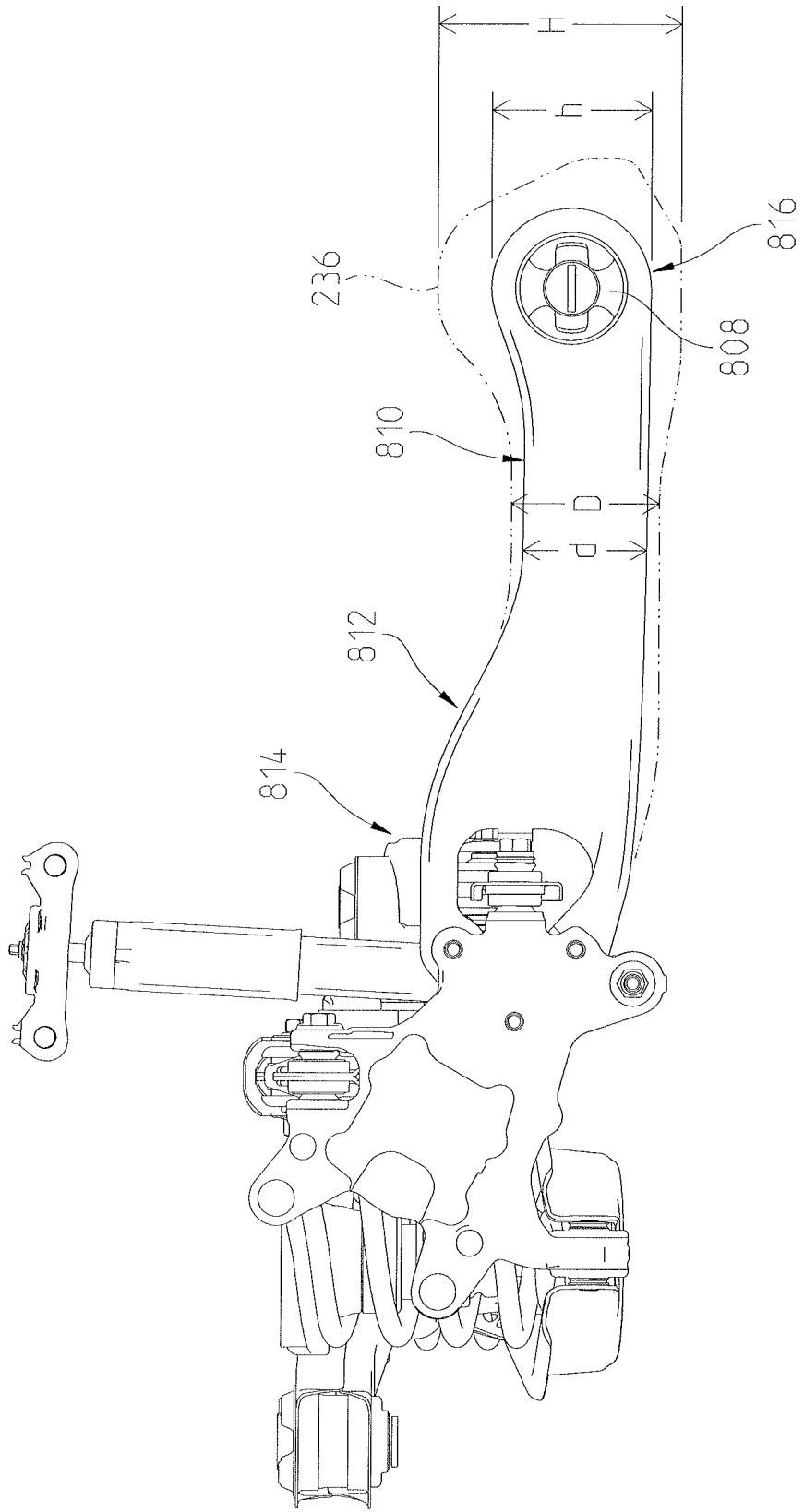
FIG. 9 is a diagrammatic side view of the modified side trailing member compared to a conventional trailing member.

Turning to FIGS. 8 and 9, a partial suspension system is illustrated with the modified K-member 400. The system may include a first modified trailing arm 800 and a second modified trailing arm 804. The first trailing arm 800 may be formed by an elongated body 802 that includes a first end 814 and a second end 816. The first end 814 may be coupled to the suspension system. Similarly, the second trailing arm 804 may include an elongated body 806 that has a first end 814 and a second end 816.

Each of the first trailing arm 800 and the second trailing arm 804 includes a bushing 808 disposed at each respective second end 816 thereof. Moreover, each modified trailing arm is designed with a low-profile to accommodate the lowered floor of the modified OEM vehicle. This is best shown in FIG. 9. Here, the trailing arm includes a sloped portion 812 defines near the first end 814 thereof. The sloped portion 812 is integrally formed with a low-profile portion 810 at a junction 818.

In FIG. 9, the modified trailing arm is compared with the trailing arm 236 of FIG. 2. As shown, the low-profile portion of the modified trailing arm has a dimensional height of d, whereas in approximately the same location the trailing arm 236 has a dimensional height of D. As shown, the modified trailing arm height d in the low-profile portion 810 is less than the height D of the trailing arm. Moreover, at the second end 816 and particularly with respect to the location of the comfort link, the modified trailing arm has a maximum height h. At the second end of the trailing arm 236, the maximum height is identified as H. As shown, the height at the second end 816 of the modified trailing arm is less, and in some instances, nearly half of the maximum height of the trailing arm. In one non-limiting example, the modified trailing arm 800 may be lowered at its second end 816 by nearly 1.5-2.0 inches compared to the trailing arm 236.

Figure 10:
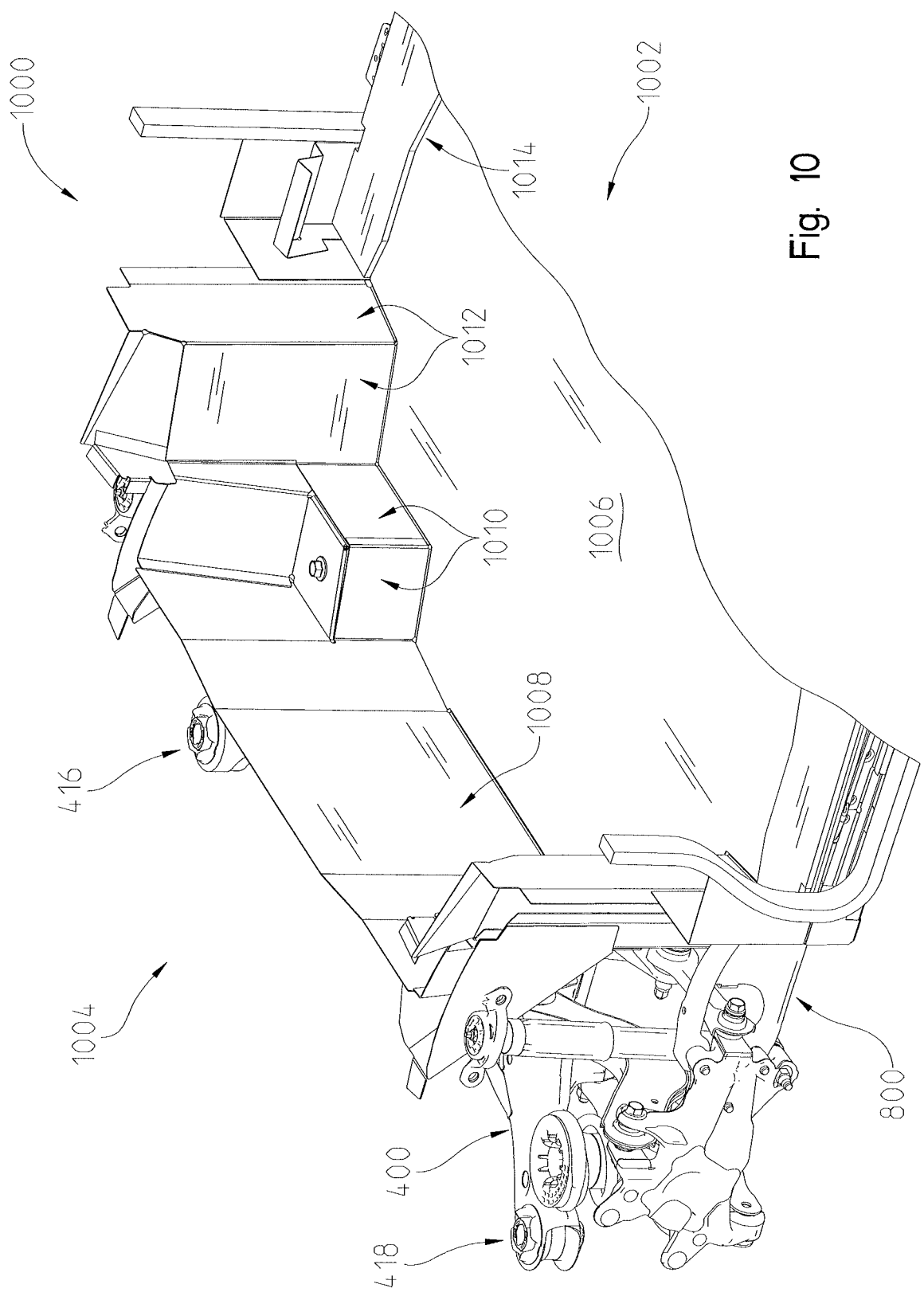
FIG. 10 is a side perspective view of an interior of a modified passenger vehicle including the K-member of FIG. 5, the modified trailing arm of FIG. 8, and a lowered vehicle floor to accommodate a wheelchair and a physically limited passenger.
Figure 11:
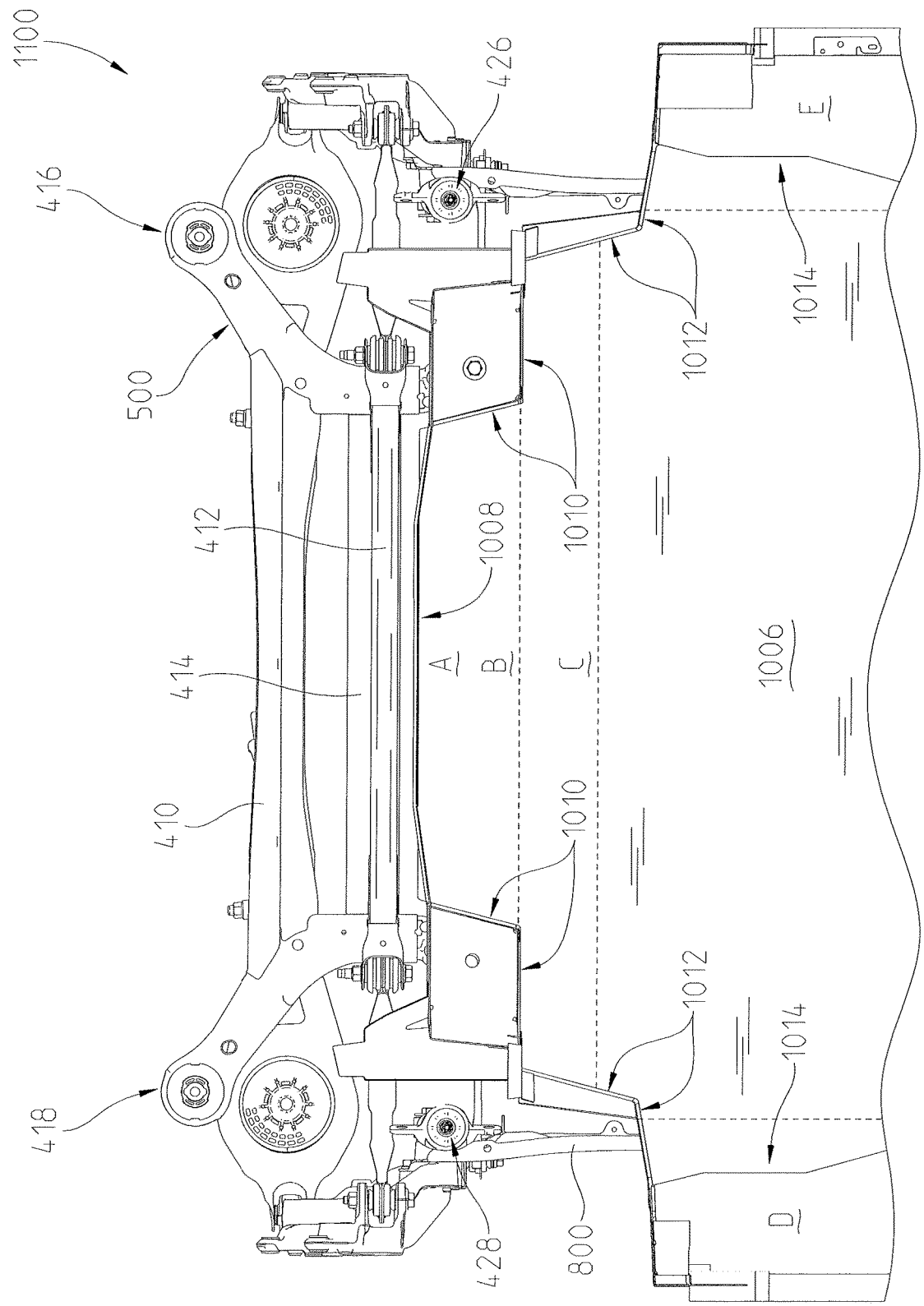
FIG. 11 is a top view of the interior of the modified passenger vehicle of FIG. 10.

The reduced height of the low-profile, modified trailing arm 800 better accommodates the lowered floor of the OEM vehicle and allows for an increase in floor space in the rear passenger compartment thereof. An example of this is shown in FIGS. 10 and 11. In FIG. 10, a perspective view of the rear passenger compartment 1000 is illustrated of a passenger vehicle. The compartment 1000 may include a forward end 1002 that is closest to the front of the vehicle, and a rear end 1004 that is towards the rear of the vehicle. The compartment 1000 may include a floor 1006 which is lowered to accommodate a wheelchaired passenger. Floor space within the rear passenger compartment 1000 is defined by a rear wall 1008 towards the rear end 1004 of the compartment, and a plurality of side walls 1010, 1012 disposed along each side thereof. The floor space may be further defined by a side portion 1014 of the vehicle as shown in FIG. 10.

In FIG. 11, a top view of the rear passenger compartment 1000 is shown. Here, an amount of floor space 1100 is better illustrated when the modified K-member and modified trailing arms are coupled to the vehicle suspension system. Moreover, the amount of floor space 1100 in FIG. 11 may be compared with the same rear passenger compartment of FIG. 3. In particular, the floor space 1100 in FIG. 11 is labeled with corresponding sections A, B, C, D and E as shown in FIG. 3. It is clear from the embodiment of FIG. 11 that the amount of floor space 1100 for a wheelchaired passenger with the modified K-member and trailing arms is much greater than the allowable floor space for the same passenger in FIG. 3. For example, unlike the K-member 200 and its first cross member 210 shown in FIG. 3, the modified K-member 400 does not have any cross member that extends above the floor 1006. Moreover, with the modified coupling members 500 being coupled to the modified K-member 400, neither front mounting location extends above the floor 1006 (unlike the two front mounting locations 216, 218 shown in FIG. 3).

In addition, the low-profile trailing arms 800 are well positioned below the floor 1006 in FIG. 11, and the comfort links 808 are similarly disposed below a horizontal plane defined by the floor 1006. By contrast, the top surfaces 304, 306 of both trailing arms extend above the same horizontal plane and thus limit the amount of floor space available to the wheelchaired passenger. As shown, the above-described and illustrated modifications to the K-member 400 and trailing arms 800 provides an increase in the amount of floor space 1100 in the rear passenger compartment 1000. As such, a wheelchaired passenger is better able to maneuver, turn, and position herself or himself within the compartment 1000. In other words, unlike the suspension system shown in FIGS. 2 and 3, the modified K-member 400 and modified low-profile trailing arms 800 remain below the horizontal plane defined by the floor 1006 and do not create any obstruction or reduction of floor space within the compartment 1000.

In addition to the above-described embodiments of the modified K-member, a further embodiment is contemplated by the present disclosure in the form of a method for manufacturing the modified K-member 400. In this method, a plurality of blocks or steps may be executed in any given order to produce the K-member. This disclosure is not intended to limit the number of blocks or steps that may be executed, or in the order each is executed, to produce the K-member.

In one example of this embodiment, a method is provided for manufacturing a modified K-member for increasing floor space within a rear passenger compartment of a vehicle having a lowered floor. In a first block or step, a K-member may be provided with many of the features described above with respect to FIGS. 2 and 3. In particular, the K-member may include a first cross member, a second cross member, and a third cross member, wherein the first cross member is positioned toward a front end of the K-member, the third cross member is positioned toward a rear end of the K-member, and the second cross member is positioned inbetween the first and third cross members. The K-member may also include at least two mounting locations at the front end and two mounting locations at the rear end. Aligned with or near the first cross member and each front mounting location, the K-member may include a toe link joint at both sides thereof.

In a second block or step, the method may include removing a front portion of the K-member, where the front portion includes the at least two front mounting locations, the toe link joints, and the first cross member. This removal process may be achieved by cutting or sawing through the K-member along a transverse axis A-A shown in FIG. 4. This axis A-A may be defined through two openings 420, 422 defined in the K-member at a location between the first cross member 210 and the second cross member 212. The front portion of the K-member may be discarded.

In a third block or step, the method may include providing a first coupling member 426 and a second coupling member 428, as shown in FIG. 4. The first coupling member 426 and second coupling member 428 may include many of the same features described in FIG. 4-7. Each coupling member, for example, may include an arm 508 or elongated portion, a toe link joint 510, a mounting location, and a curved portion 700. The toe link joint 510 may include a first finger 512 and a second finger 514. The toe link joint 510 may be oriented at an angle Θ relative to the arm 508. Additional features may be included in the coupling member as described above.

In a fourth block or step, the method may further include inserting the arm 508 or elongated portion of the first and second coupling members into a cavity or sleeve portion 516 of the K-member. Once inserted, the coupling member may be coupled to the K-member via any known method including, but not limited to, welding, adhering, or mechanical fastening. Each coupling member may be coupled to the K-member such that the toe link joint 510 is oriented outwardly, and the arm 508 is oriented in a substantial longitudinal direction.

Once the modified K-member is assembled, it may include many of the features described above and shown in FIGS. 4-7. In particular, the modified K-member 400 only includes a front cross member 412 and a rear cross member 410. The K-member 400 may further include a reinforcement member or layer 414 which is coupled thereto in a further block or step of the manufacturing method. The reinforcement member or layer 414 may be coupled at each end of the K-member via any known method including welding or mechanical fastening. As shown best in FIG. 4, the reinforcement member 414 or layer may be disposed rearward of the front cross member 412 and forward of the rear cross member 410. In the embodiment of FIG. 4, the reinforcement member 414 or layer may be disposed transversely with respect to the longitudinal direction of which the arms 508 of the coupling members are oriented. Further, the reinforcement member 414 or layer may be disposed closer to the front cross member 412 than the rear cross member 410 as shown in FIG. 4.

The modified K-member may be assembled in the modified passenger vehicle according to known methods. Once installed, the entire modified K-member is positioned below a horizontal plane defined by the floor of the rear passenger compartment.

In a further block or step, a modified trailing arm having a low-profile portion similar to that shown in FIGS. 8 and 9 may be provided. The modified trailing arm may replace trailing arms and be assembled to the vehicle according to known methods. Similar to the modified K-member, the entire modified trailing arm may be assembled to the vehicle and be positioned below the horizontal plane defined by the floor of the rear passenger compartment of the vehicle. This is shown best in FIG. 11 of the present disclosure.

While the above method is described relative to the illustrated embodiments of this disclosure, one skilled in the art will appreciate that the modified K-member may be manufactured in other manners. For example, the modified K-member may be manufactured from scratch without having to cut or remove any portion from a K-member. In other words, the K-member may be simply removed from the OEM vehicle and discarded. A newly modified K-member may replace the K-member in this example.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. For instance, the present disclosure is not limited to the modification of a purchased OEM vehicle, but can be incorporated into the OEM vehicle when manufactured. Further, this application is intended to cover such departures from the present disclosure as come within known or customary practice in the art to which this disclosure pertains and which fall within the limits of the appended claims.

The invention claimed is:

1. A K-member for a modified passenger vehicle to accommodate a wheelchaired passenger in a rear passenger compartment thereof, the K-member comprising:
a body having a front end, a rear end opposite the front end, a first side, and a second side opposite the first side;
a first cross member coupled to the body;
a second cross member coupled to the body at a location rearward of the first cross member, where the first and second cross members are coupled transversely with respect to the body between the first side and the second side;
a first coupling member coupled to the body at a location towards the front end and first side, the first coupling member including an elongated portion, a curved portion, and a toe link joint, where the toe link joint is angularly disposed relative to the elongated portion; and
a second coupling member coupled to the body at a location towards the front end and second side, the second coupling member including an elongated portion, a curved portion, and a toe link joint, where the toe link joint is angularly disposed relative to the elongated portion;
wherein:
the body defines a first cavity; and
the elongated portion of the first coupling member is positioned within the first cavity.

2. The K-member of claim 1, further comprising a reinforcement member coupled to the body and extending transversely between the first and second sides, the reinforcement member being substantially parallel to the first and second cross members.

3. The K-member of claim 2, wherein the reinforcement member is located below the first cross member.

4. The K-member of claim 1, wherein:
the body comprises a first mounting location and a second mounting location, the first mounting location disposed at the rear end and first side, and the second mounting location disposed at the rear end and second side;
the first coupling member comprises a third mounting location; and
the second coupling member comprises a fourth mounting location.

5. The K-member of claim 4, wherein:
the third mounting location defines a splined opening;
a capsule and a bushing are coupled to the third mounting location via the splined opening.

6. The K-member of claim 1, wherein:
the body defines a second cavity; and
the elongated portion of the second coupling member is positioned within the second cavity.

7. The K-member of claim 1, wherein each toe link joint comprises a first finger and a second finger oriented in a direction towards the first or second side.

8. The K-member of claim 7, wherein the first finger and the second finger each comprises an opening through which a pivot axis is defined.

9. The K-member of claim 1, wherein the body comprises a spring link joint adapted to couple to a spring link.

10. A coupling member for being coupled to a K-member of a vehicular suspension system, comprising:
a body including an elongated portion integrally formed with a curved portion;
a toe link joint integrally formed with the curved portion, the toe link joint including a first finger spaced from a second finger;
a mounting location formed in the body at a location between the elongated portion and the toe link joint;
a capsule coupled to the mounting location; and
a bushing coupled to the capsule;
wherein the mounting location comprises internal splines defined within an opening formed therein.

11. The coupling member of claim 10, wherein the toe link joint is angularly disposed relative to the elongated portion.

12. The coupling member of claim 11, wherein the toe link joint is angularly disposed at an angle greater than 30° relative to the elongated portion.

13. The coupling member of claim 10, wherein the first finger and the second finger each comprises an opening through which a pivot axis is defined.

14. A vehicle modified to accommodate a wheelchaired passenger, comprising:
a chassis including a front and a rear;
a rear passenger compartment defined at the rear of the chassis, the rear passenger compartment including a lowered vehicular floor and an amount of floor space defined therein by at least a rear wall, a first side wall, and a second side wall;
a suspension system including a K-member and a pair of low-profile trailing arms;
the K-member comprising:
a body having a front end, a rear end opposite the front end, a first side, and a second side opposite the first side;
a first cross member coupled to the body;
a second cross member coupled to the body at a location rearward of the first cross member, where the first and second cross members are coupled transversely with respect to the body between the first side and the second side;
a first coupling member coupled to the body at a location towards the front end and first side, the first coupling member including an elongated portion, a curved portion, and a toe link joint, where the toe link joint is angularly disposed relative to the elongated portion; and
a second coupling member coupled to the body at a location towards the front end and second side, the second coupling member including an elongated portion, a curved portion, and a toe link joint, where the toe link joint is angularly disposed relative to the elongated portion;
wherein, in an assembled configuration, the K-member and the pair of low-profile trailing arms are positioned below a horizontal plane defined by the lowered vehicular floor of the rear passenger compartment.

15. The vehicle of claim 14, wherein each of the pair of low-profile trailing arms comprises a body having a first end and a second end, the body including a sloped portion at the first end, a comfort link at the second end, and a low-profile portion defined therebetween.

16. The vehicle of claim 14, further comprising a reinforcement member coupled to the body and extending transversely between the first and second sides, the reinforcement member being substantially parallel to the first and second cross members.

17. The vehicle of claim 16, wherein the reinforcement member is located below the first cross member.

18. The vehicle of claim 14, wherein:
the body comprises a first mounting location and a second mounting location, the first mounting location disposed at the rear end and first side, and the second mounting location disposed at the rear end and second side;
the first coupling member comprises a third mounting location; and
the second coupling member comprises a fourth mounting location.

19. The vehicle of claim 14, wherein:
the body defines a first cavity and a second cavity;
the elongated portion of the first coupling member is positioned within the first cavity; and
the elongated portion of the second coupling member is positioned within the second cavity.

* * * * *